(12) United States Patent
Nim

(10) Patent No.: US 7,156,586 B2
(45) Date of Patent: Jan. 2, 2007

(54) WIND TURBINE WITH FLOATING FOUNDATION

(75) Inventor: Erik Nim, Herning (DK)

(73) Assignee: Vestas Wind Systems A/S, Ringkobing (DK)

( * ) Notice: Subject to any disclaimer, the term of this patent is extended or adjusted under 35 U.S.C. 154(b) by 0 days.

(21) Appl. No.: 10/541,203

(22) PCT Filed: Jan. 6, 2003

(86) PCT No.: PCT/DK03/00002

§ 371 (c)(1),
(2), (4) Date: Dec. 13, 2005

(87) PCT Pub. No.: WO2004/061302

PCT Pub. Date: Jul. 22, 2004

(65) Prior Publication Data

US 2006/0165493 A1   Jul. 27, 2006

(51) Int. Cl.
*F03D 11/04* (2006.01)
*B63B 35/00* (2006.01)

(52) U.S. Cl. .............................. 405/223.1; 405/195.1; 405/224

(58) Field of Classification Search ............. 405/195.1, 405/223.1, 224
See application file for complete search history.

(56) References Cited

U.S. PATENT DOCUMENTS 7,075,189 B1 * 7/2006 Heronemus et al. .......... 290/44
7,100,438 B1 * 9/2006 LeMieux .................. 73/170.16
2004/0103655 A1   6/2004 Lauritsen

FOREIGN PATENT DOCUMENTS

| DE | 101 10 405 A1 | 7/2002 |
|---|---|---|
| EP | 1 174 336 A1 | 1/2002 |
| GB | 2 378 679 A | 2/2003 |
| JP | 2001-248535 | 9/2001 |
| WO | WO 3004869 A1 * | 1/2003 |

* cited by examiner

*Primary Examiner*—Frederick L. Lagman
(74) *Attorney, Agent, or Firm*—Stites & Harbison PLLC; Douglas E. Jackson

(57) ABSTRACT

A floating foundation for wind turbines is disclosed, where the foundation essentially comprises at least three submerged buoyancy bodies connected to the lower end of the tower of the wind turbine at a common node member situated well above the surface of the sea. The buoyancy bodies are connected to the node member by means of relatively thin leg sections, whereby wave load on the foundation is reduced. By applying the foundation according to the present invention, stress concentrations and torques in the node member are reduced, whereby it becomes possible to apply a relatively lightweight and hence cheap node member. The overall weight of the construction is thereby reduced and hence the volume of the buoyancy bodies necessary to counteract the overall weight of the construction.

13 Claims, 3 Drawing Sheets

WIND TURBINE WITH FLOATING FOUNDATION

TECHNICAL FIELD

The present invention relates to wind turbines with floating foundations and more particularly to such wind turbines for use in offshore installations at greater water depths and under conditions where the installation is subjected to both heavy wind loads and to great dynamic forces from the movement of the sea.

BACKGROUND OF THE INVENTION

Wind turbines for converting wind energy to electrical power have been known and applied for many years but have found a dramatically increased application as an alternative energy source during the last couple of decades. It has become common to place wind turbines together in large groups of turbines often counting hundreds of wind turbines within a restricted area. Such large collections of wind turbines can provide an environmentally less desirable solution both from an aesthetic point of view and also due to the inevitable noise problems they cause. Furthermore, the positioning of wind turbines on land may not always be an optimal placement, as it is preferable that the blades of the wind turbine be located in a laminate flow of air which is not always obtained on land due to for instance the presence of hills, woods, buildings, etc. It has hence become popular to locate groups of wind turbines offshore, not too far from the coast at locations where water depths allow the wind turbines to be fixedly attached to a foundation provided at the bottom of the sea. Over water, the flow of air is not disturbed by the presence of various obstacles as mentioned above and furthermore, such placements may be advantageous from an environmental point of view.

Due to the large dimensions of present-day wind turbines—dimensions which furthermore tend to increase due to the relation between the diameter of the rotor and the maximum electrical power which the wind turbine can provide—it is vitally important that the wind turbine be provided with a stable foundation. This is not in principle a problem for wind turbines located on the ground but becomes a problem in connection with offshore wind turbines. One prior art solution is to mount the tower of the wind turbine on a suitable construction of pillows and grids, this construction being fixed to a firm foundation on the bottom of the sea, but this solution is expensive and primarily applicable at relatively shallow waters, i.e. up to depths of around 25 meters.

For the application in connection with offshore wind turbines positioned at larger water depths, floating foundations have been described in various prior art documents. Thus, for instance DE 100 34 847 A1 discloses a floating foundation for instance for offshore wind turbines designed for water depths of up to 100 meters. This floating foundation comprises a pyramidal buoyancy body (or rather structure) with a generally quadratic base, the buoyancy structure being formed by a number of cylindrical bodies or tubes. The tower of the wind turbine is placed centrally on this buoyancy structure. The buoyancy structure is maintained on site by means of four tensioned tethers attached to each of the four corners of the quadratic base. The tower itself penetrates the surface of the sea and extends to the base of the buoyancy structure.

A floating offshore wind power installation is disclosed in WO 01/73292 A1. The installation comprises a raft consisting of two cylindrical carrying pontoons acting as buoyancy bodies placed in parallel relationship to each other for carrying a tower provided with a wind turbine at its upper end. The tower extends normally to the plane of the cylindrical pontoons and in order to attain sufficient stability of the connection between the tower and the pontoons, a stiffening wire extends between one end of the pontoons and a point in the vicinity of the upper end of the tower. However, the wires between the buoyancy bodies and the top portion of the tower can not be applied in systems where the nacelle must be relatable relative to the tower, which is necessary, when the buoyancy body or -bodies are fixed to the bottom of the sea in a manner that prevents rotation of the buoyancy bodies about the longitudinal axis through the tower. Hence, the solution disclosed in this document is not applicable for a wind turbine according to the present invention. Such wire stiffeners would at any rate not provide a solution of satisfactory stability in systems with high towers and hence long wires.

DISCLOSURE OF THE INVENTION

On the above background it is thus an object of the present invention to provide a wind turbine with a floating foundation of the tension leg type, in which an improved structural stability is attained and according to which a significant reduction of the weight of the part of the structure connecting the tower of the wind turbine with the buoyancy bodies can nevertheless be obtained. This weight reduction results among other things in a significant reduction of the price of the foundation and it also facilitates handling of the structure during transport from a harbour to the offshore site of the installation as well as during the final installation of the structure on site.

It is a further object of the present invention to provide a foundation, in which wave loads on the foundation are reduced.

These and other objects are attained with floating foundation for wind turbines according to the characterising clause of claim 1.

According to the present invention there is thus provided a floating foundation comprising at least three submerged buoyancy bodies, each of which are connected to the tower of the wind turbine via a separate connecting member or a leg section, such that the at least three leg sections are joined with the tower by means of a common central node member positioned in such a manner relative to the buoyancy bodies that the forces taken up by the node member and the torque exerted on the node member due to wind loads on the rotor and the tower are significantly reduced compared to prior art structures, and such that the parts of the foundation penetrating the surface of the water, and hence subjected to wave loads, are kept as limited in extent as possible, thereby reducing the effect of wave loads on the foundation, compared for instance to foundations in which the tower itself penetrates the surface of the water.

According to a presently preferred embodiment of the invention, said node member is formed as a separate body provided with suitable attachment means for the tower and for the foundation, but in principle it would also be possible to form the node member as an integral part of either the tower or the foundation. Which solution is chosen will for instance depend on the specific dimensions of the wind turbine, specific problems relating to the transport to the offshore site and the installation on site.

According to the present invention there is thus attained the very important advantage of reducing the dimensions and necessary strength of the central node member. This aspect is important as it reduces the weight of the node member and hence also the dimensions of the buoyancy body necessary to counteract the weight of the total construction. Hence, also the costs of producing the node member are reduced and the handling of this member is facilitated.

The wind turbine with tension leg foundation according to the invention is maintained on site by means of suitable anchor means or tethers extending for instance from each of the buoyancy bodies to the bottom of the sea. Preferably one tether is extended from each of the buoyancy bodies, although in principle each buoyancy body could be provided with more tethers. When no horizontal forces are acting on the foundation, the tethers extend substantially vertically from the buoyancy bodies, but in practice, due to wind loads on the rotor and the tower and other horizontal forces acting on the foundation, the tethers will extend at an angle to the vertical. A basic characteristic of the foundation according to the present invention is thus that the torque exerted on the rotor from the wind load is counteracted by a pair of forces in the tethers. It is important to note that the ratio between the total buoyancy and the overall weight of the construction should be such that the tethers are kept under tension under all circumstances.

By reducing the weight of essential components of the foundation, less buoyancy of the foundation is required, which is highly beneficial from a point of view of cost reduction of the total structure.

Important new aspects of the foundation according to the present invention as compared to for instance the prior art constructions mentioned above and shown in principle in FIG. 1 are:

1. The central node member has been displaced upward to a position well above the surface of the sea, whereby the wind load exerted on the rotor is taken up as a pair of forces in the leg sections of the foundation, which may lead to a significant reduction of the weight of the construction. Also the torque on the central node member is significantly reduced, the reduction being determined by the geometry of the member, which is of importance, as this member could otherwise become very heavy and expensive. Thus, by reducing the torque in the node member it becomes possible to apply a less sturdy construction of this member, and hence make it lighter and cheaper.
2. By proper geometrical design of the node member it is possible to obtain a relatively uniform distribution of forces in the node member, whereby only relatively moderate stress concentrations will occur in the node member. Thus, by designing the node member in such a manner that the leg sections form angles in the range of approximately 40 to 50 degrees relative to the tower, said stress concentrations can be drastically reduced compared to those prior art foundations, where the angle between the tower and the legs is approximately 90 degrees, as shown schematically in FIG. 1. One further advantage attained according to the invention is that it becomes possible to avoid using various stiffening means, such as indicated by S and W in FIG. 1. Thereby, overall weight of the foundation is further reduced—with an accompanying reduction of the volume of the buoyancy bodies necessary to counteract the weight of the construction—and an overall simplification of the construction is obtained.
3. With a foundation according to the present invention with said at least three separate buoyancy bodies, the majority of buoyancy is displaced to a region above the tethers, with the result that the buoyancy does not lead to significant torques in the connecting members between the buoyancy bodies and the node member.
4. With a foundation according to the invention, where the surface of the sea is only penetrated by a number of separate and relatively thin connecting members or leg sections, wave loads on the foundation can be reduced compared to foundations, in which the tower itself penetrates the surface of the sea, by proper dimensioning and shaping of the commenting members. Also in this respect, the reduced overall weight of the structure as mentioned above plays an important role.

BRIEF DESCRIPTION OF THE DRAWINGS

The invention will now be described in more detail with reference to the accompanying drawings, in which.

DETAILED DESCRIPTION OF THE INVENTION

In the following, a detailed description of an embodiment of the floating tension leg foundation for wind turbines according to the invention is given.

Figure 2:
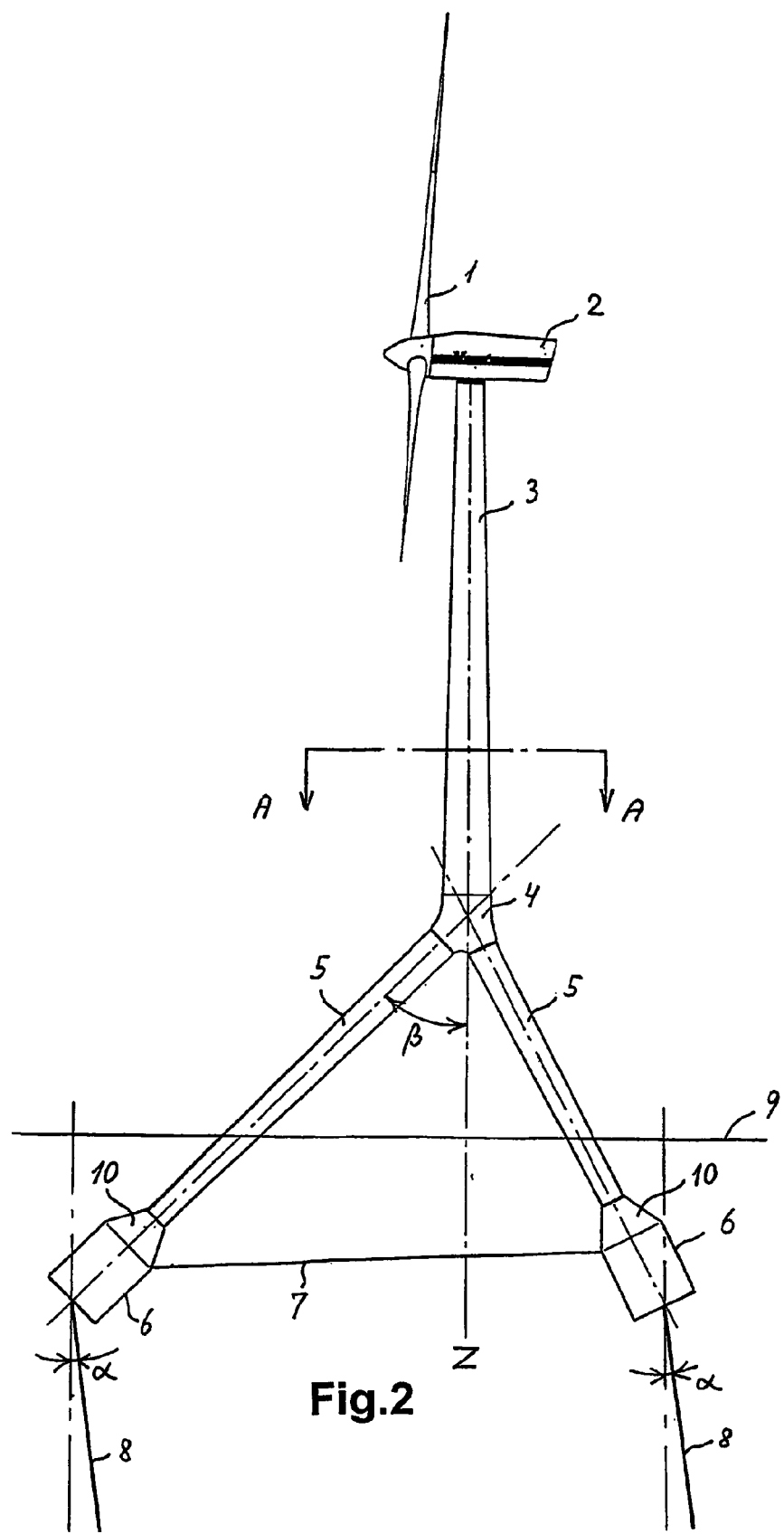
FIG. 2 is a floating foundation according to an embodiment of the invention.
Figure 3:
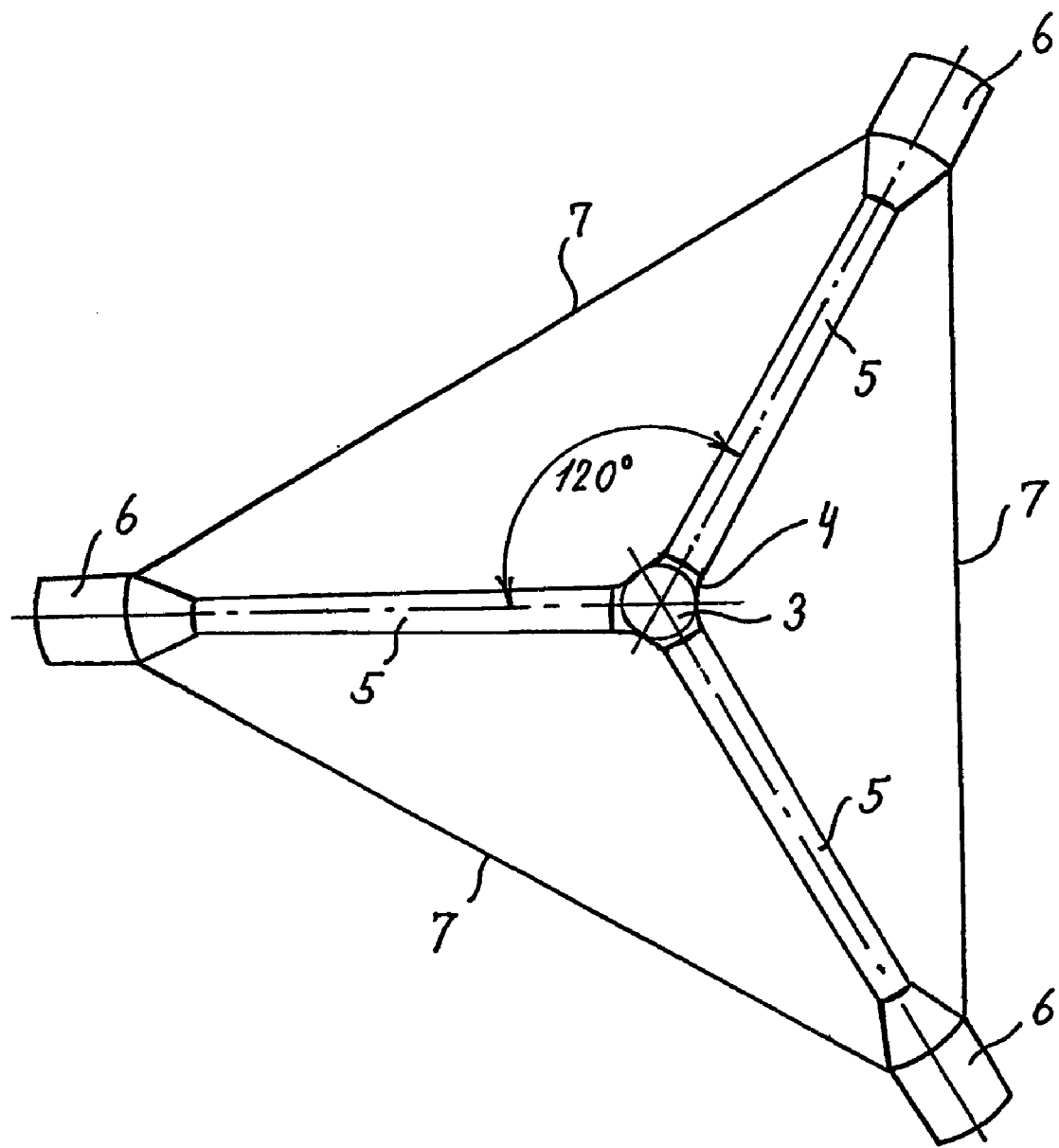
FIG. 3 is the floating foundation shown in FIG. 2 viewed from above as indicated by A—A in FIG. 2.

A presently preferred embodiment of the invention is shown in FIGS. 2 and 3. A wind turbine comprising a rotor 1 and a nacelle 2 is placed at the upper end of the tower 3. The lower end of the tower 3 is connected to a node member 4, from which node member three leg sections 5 extend downwardly at an angle $\beta$ relative to the vertical axis Z through the tower 3. As shown in FIG. 3, the three leg sections are distributed in the horizontal plane at identical angular intervals of 120 degrees.

At the ends of the leg sections 5 there are provided buoyancy bodies 6, in the shown embodiment in the form of a cylindrical body connected to the leg sections 5 via a conical transition member 10. One separate buoyancy body is connected to each of the leg sections. Although the buoyancy bodies are shown as cylindrical bodies in this embodiment, it is understood that other suitable shapes of buoyancy bodies could also be used. Furthermore, according to the embodiment shown in FIGS. 2 and 3 adjacent buoyancy bodies are connected to each other by a tension member 7, for instance in the form of a pre-tensioned wire. Furthermore, according to the shown embodiment each of the separate cylindrical buoyancy bodies have their longitudinal axis coincident with the longitudinal axis of the leg sections 5, but the present invention is not limited to this.

Each of the buoyancy bodies 6 are anchored to the bottom of the sea by means of suitable anchor chains or tethers 8, which due to the wind load on the rotor 1 and other parts of the structure in practice will extend downwardly at an angle $\alpha$ relative to the vertical. As mentioned above, it is in practice important that the difference between the total buoyancy of the foundation and the total weight hereof should be large enough to ascertain that the tethers 8 are kept under tension in all situations, i.e. under any combination of wind loads and wave loads on the structure.

Figure 1:
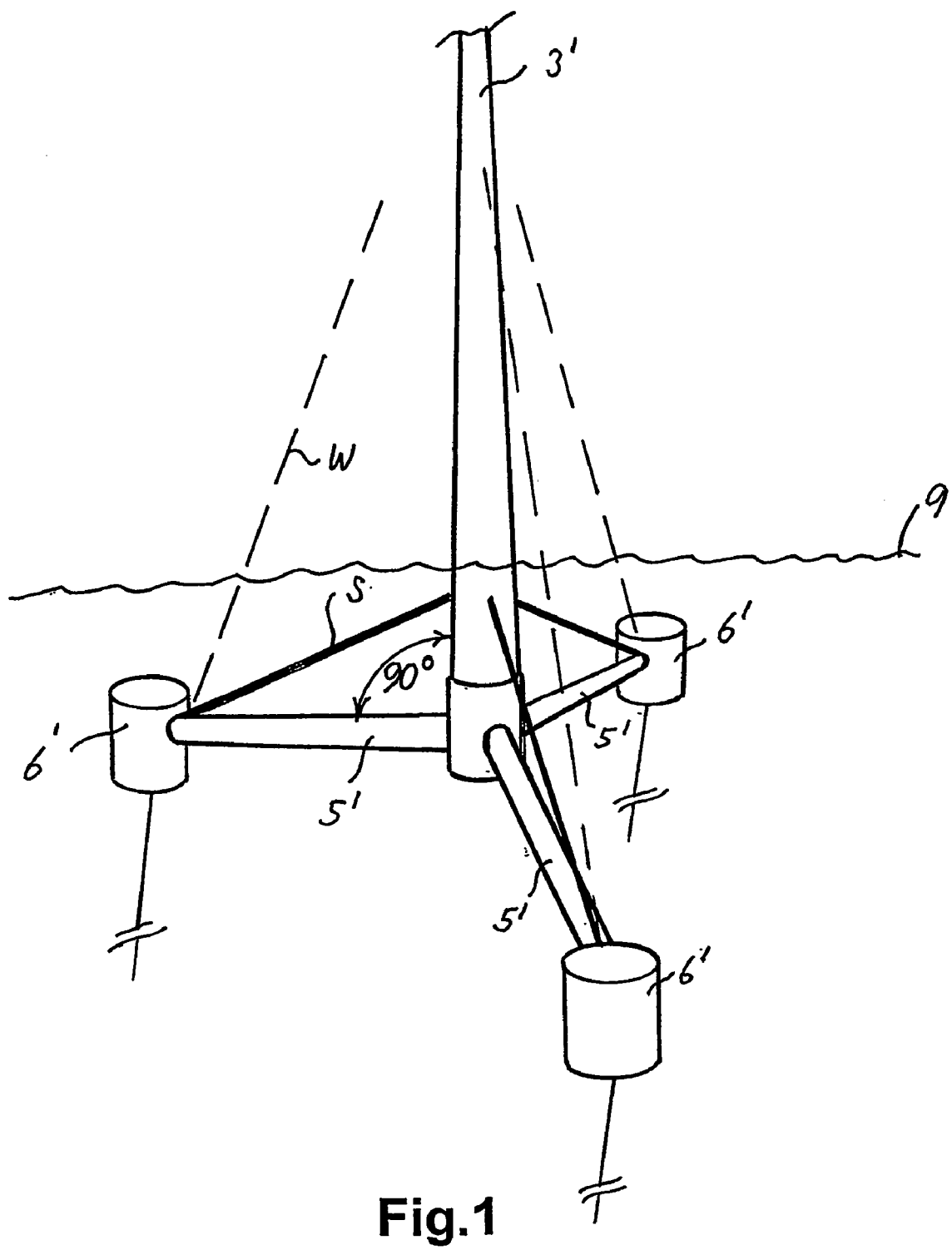
FIG. 1 is a schematic representation of a prior art floating foundation.

According to the shown embodiment, the angle $\beta$ relative to the vertical axis Z is substantially 45 degrees, which is optimal in the sense that forces exerted on the node member are relatively uniformly distributed, resulting in moderate stress concentrations in the node member. In the construction shown in FIG. 1, where the angle between the legs and the tower is 90 degrees, considerably larger stresses in the node member will occur under heavy wind loads on the rotor and tower.

Although the dimensions of a wind turbine with tension leg foundation according to the invention can of course vary according to the specific circumstances, typical dimensions could be: A total height of the nacelle 2 above sea level 9 of approximately 70 meter, of which the tower 3 itself could account for 45 to 50 meters. The node member 4 could be positioned approximately 20 to 25 meters above sea level 9, and the length of each of the leg sections 5 would—under the assumption that the angle β relative to the vertical axis Z is approximately equal to 45 degrees—be approximately 35 to 40 meters. Typical volumes of each of the buoyancy bodies 6 including the conical transition members 10 would, in order to ascertain sufficient buoyancy to always keep the tethers under tension, be approximately 250 cubic meters, of course dependent on the overall weight of the total structure as mentioned above. A typical weight of the node member 4 could be in the order of 30 tons.

Although a presently preferred embodiment of the present invention has been shown and described in the preceding parts of the detailed description, it is understood that a person skilled in the art may conceive other embodiments of the invention without departing from the scope of the invention as defined by the following claims. Thus, for instance, other numbers of leg sections and corresponding buoyancy bodies might be used instead of the three shown above and the node member could—as mentioned—be formed as an integral part of either the tower or of the foundation.

The invention claimed is:

1. A wind turbine with floating foundation comprising a tower supported on a foundation provided with a buoyancy structure which is maintained on site by suitable anchor means, characterized in that said buoyancy structure comprises at least three separate buoyancy bodies each connected to a lower end of the tower at a level substantially above sea level by a separate leg section.

2. A wind turbine with floating foundation according to claim 1, characterized in that said connection to the lower end of the tower takes place via a common node part.

3. A wind turbine with a floating foundation according to claim 2, characterized in that said node part is a separate node member.

4. A wind turbine with floating foundation according to claim 1, characterized in that said leg sections are of a circular cross-section.

5. A wind turbine with floating foundation according to claim 2, characterized in that said node part is positioned at a distance above the surface of the sea which is at least 30% of the total height of the tower above the surface of the sea.

6. A wind turbine with floating foundation according to claim 1, characterized in that said buoyancy bodies are cylindrical.

7. A wind turbine with floating foundation according to claim 6, characterized in that the longitudinal axis of the buoyancy bodies is coincident with the longitudinal axis of the corresponding leg section.

8. A wind turbine with floating foundation according to claim 6, characterized in that the buoyancy bodies are connected to the corresponding leg sections via a conical transition member.

9. A wind turbine with floating foundation according to claim 1, characterized in that said connection of the separate buoyancy members to the tower takes place under an angle relative to the vertical axis Z through the tower between 40 and 50 degrees.

10. A wind turbine with floating foundation according to claim 1, characterized in that said connections of the separate buoyancy members to the tower are uniformly distributed in the horizontal plane.

11. A wind turbine with floating foundation according to claim 1, characterized in that each of the separate buoyancy bodies are provided with anchor means for maintaining the foundation on site.

12. A wind turbine with floating foundation according to claim 1, characterized in that adjacent buoyancy bodies are interconnected by means of a tension member.

13. A wind turbine with floating foundation according to claim 12, characterized in that said tension members are pre-tensioned wires.

* * * * *